UNITED STATES PATENT OFFICE.

EDWIN EDSER, OF BROCKLEY, LONDON, AND STANLEY TUCKER, OF LONDON, ENGLAND, ASSIGNORS TO MINERALS SEPARATION NORTH AMERICAN CORPORATION, OF NEW YORK, N. Y.

SOFTENING WATER.

1,333,393.     Specification of Letters Patent.     Patented Mar. 9, 1920.

No Drawing.     Application filed July 3, 1918. Serial No. 243,176.

*To all whom it may concern:*

Be it known that we, EDWIN EDSER, a subject of the King of England, residing at Brockley, London, England, and STANLEY TUCKER, a subject of the King of England, residing at London, England, have invented certain new and useful Improvements in Softening Water, of which the following is a specification.

This invention relates to improvements in softening water, and it has for its object to provide a cheap and expeditious method therefor.

As is well-known, most natural waters contain in solution varying quantities of salts which render it difficult to obtain a lather with soap. Calcium and magnesium salts are most largely present in natural waters, and in order to obtain a lather or froth with soap the latter must be added to the water in excess of the amount required to combine with the said salts.

The present invention consists in softening water by precipitating its dissolved salts which produce the hardness (for example calcium and magnesium salts) and forming the said precipitate into a froth which floats on the surface of the water, and removing the froth.

Preferably the said salts are precipitated as insoluble phosphates with, for example, tri-sodium phosphate or di-sodium hydrogen phosphate and sodium hydrate. However, if desired they may be precipitated with lime, caustic soda, sodium carbonate, sodium oxalate, barium hydrate, or suitable mixtures of these reagents, or other materials.

The precipitate is formed into a froth by a modification of the froth-flotation process of concentrating ores described, for example, in the prior United States Patents Nos. 835120, 962678 and 1064723, and application Serial No. 162,320, a mineral-frothing agent with or without other agent or agents being added to the water containing the precipitate, and the mixture then aerated as by agitating it to introduce air. As the frothing-agent it is preferred to use a soluble soap, such as sodium oleate, sodium stearate or sodium palmitate.

In carrying the invention into effect the tri-sodium phosphate or di-sodium hydrogen phosphate and sodium hydrate are added to the water, and the soluble soap then added and the mixture thoroughly agitated and aerated. On allowing it to come to rest, as by running it into a spitzkasten, a copious froth containing the precipitated phosphates floats on the surface and may be removed by overflow or by other means.

In treating London tap water by the present process, 1.6 lbs. of tri-sodium phosphate or 1.6 lbs. of di-sodium hydrogen phosphate and 0.23 lb. of caustic soda per ton of water was found to precipitate the dissolved calcium and magnesium salts, and 0.06 lb. of sodium oleate per ton of water was employed to produce a froth of the precipitates.

Among other frothing agents that may be employed in the present process oleic acid, eucalyptus and turpentine have been found to give good results.

It is to be understood that other salts than those of calcium and magnesium may be removed from water by the process according to the present invention. For example iron salts may be precipitated and the precipitate included in the froth with the calcium and magnesium salts; and soluble salts of copper or zinc may be precipitated with lime or caustic soda, and the precipitate removed as a froth. For this purpose turpentine has been found to be a suitable frothing agent.

The frothing agent may be added to the water together with the precipitating agent if desired, and the agitation should preferably be violent in order to give sufficient aeration and produce a satisfactory froth.

When employing soap as the frothing agent, in certain cases it has been found that the quantity necessary may be lessened by using with it a small proportion of turpentine or eucalyptus. The best materials and most suitable quantities may be readily ascertained by a simple laboratory experiment.

Water softened by the process according to the present invention is found to be particularly suitable for carrying out certain modifications of the froth-flotation process of concentrating ores.

What we claim as our invention and desire to secure by Letters Patent is:—

1. The process of softening water which consists in precipitating its dissolved salts which produce the hardness, adding a small proportion of a mineral-frothing agent, agitating and aerating the mixture for the formation of a flotation froth carrying the precipitated salts, and removing the froth.

2. The process of softening water which consists in precipitating its dissolved salts which produce the hardness, adding a small proportion of a soluble soap, agitating and aerating the mixture for the formation of a flotation froth carrying the precipitated salts, and removing the froth.

3. The process of softening water which consists in precipitating its dissolved salts which produce the hardness, adding a small proportion of sodium oleate, agitating and aerating the mixture for the formation of a flotation froth carrying the precipitated salts, and removing the froth.

4. The process of softening water which consists in precipitating, with tri-sodium phosphate, salts dissolved therein which produce the hardness, adding a small proportion of a mineral-frothing agent, agitating and aerating the mixture for the formation of a flotation froth carrying the precipitated salts, and removing the froth.

5. The process of softening water which consists in precipitating, with tri-sodium phosphate, salts dissolved therein which produce the hardness, adding a small proportion of a soluble soap, agitating and aerating the mixture for the formation of a flotation froth carrying the precipitated salts, and removing the froth.

In testimony whereof we have signed our names to this specification in the presence of two subscribing witnesses.

EDWIN EDSER.
STANLEY TUCKER.

Witnesses:
ALBERT OWEN WILLIAMS,
WILLIAM JAMES WALTON.